United States Patent [19]

Ando

[11] Patent Number: 4,697,467
[45] Date of Patent: Oct. 6, 1987

[54] ROTARY TO LINEAR CONVERTER FOR USE IN A FLEXIBLE MAGNETIC DISK DRIVE OR THE LIKE

[75] Inventor: Yasuhiko Ando, Tachikawa, Japan

[73] Assignee: Teac Corportion, Tokyo, Japan

[21] Appl. No.: 839,440

[22] Filed: Mar. 13, 1986

[30] Foreign Application Priority Data

Mar. 18, 1985 [JP] Japan .............................. 60-39602[U]

[51] Int. Cl.⁴ .......................... F16H 21/44; G11B 5/56
[52] U.S. Cl. .................................... 74/89.2; 74/89.22; 360/106
[58] Field of Search ................... 74/89.2, 89.21, 89.22, 74/108; 360/106, 109; 403/407.1, 406.1, 405.1, 254

[56] References Cited

U.S. PATENT DOCUMENTS

| | | | |
|---|---|---|---|
| 2,999,570 | 9/1961 | Seiz | 403/405.1 |
| 3,881,189 | 4/1975 | Mayeda | 360/106 |
| 4,161,004 | 7/1979 | Dalziel | 360/106 |
| 4,247,877 | 1/1981 | Keller et al. | 360/109 |
| 4,321,956 | 3/1982 | Martinelli | 403/407.1 |
| 4,366,722 | 1/1983 | Hasler | 360/106 |
| 4,419,707 | 12/1983 | Woodier | 74/892 |
| 4,423,447 | 12/1983 | Nishida | 360/106 |
| 4,476,508 | 10/1984 | Tronzano et al. | 74/89.2 |
| 4,577,521 | 3/1986 | Takikawa | 74/89.2 |
| 4,587,587 | 5/1986 | Miller | 360/109 |

Primary Examiner—Cornelius J. Husar
Assistant Examiner—Anthony Knight
Attorney, Agent, or Firm—Woodcock Washburn Kurtz Mackiewicz & Norris

[57] ABSTRACT

A rotary to linear converter is disclosed in a flexible magnetic disk drive environment for translating the bidirectional, incremental rotation of a stepping motor into the linear stepwise displacement of a head carriage. A flexible, nonstretchable band is looped about a pulley nonrotatably mounted on the motor output shaft and is affixed thereto. Extending generally in opposite directions away from the pulley, the opposite ends of the band are apertured or otherwise adapted for engagement with respective hooks on the head carriage. Each hook has a substantially arcuate contact surface for direct engagement with the correspondingly shaped edge of the band defining the associated aperture, so that each end portion of the band is angularly displaceable in its own plate about the associated hook on the head carriage. Spring tensioned in its longitudinal, the band automatically aligns itself by simple engagement of the carriage hooks with its opposite ends. The hooks have overhangs for preventing the accidental detachment of the band.

9 Claims, 11 Drawing Figures

ROTARY TO LINEAR CONVERTER FOR USE IN A FLEXIBLE MAGNETIC DISK DRIVE OR THE LIKE

BACKGROUND OF THE INVENTION

My invention relates to a device for translating rotary motion into linear motion, and more specifically to such a device employing a flexible, nonstretchable band looped about a rotary member, called a pulley, for converting its bidirectional rotation into the linear reciprocating motion of another member. The rotary to linear converter in accordance with my invention has particular utility in conjunction with apparatus for the transfer of information with flexible magnetic disks, now commonly referred to as floppy disks, wherein a magnetic transducer head is linearly moved back and forth in a radial direction of the floppy disk in response to the bidirectional, incremental rotation of an electric stepping motor.

In floppy disk drives (FDDs) the bidirectional, incremental rotation of the stepping motor must be translated into the linear stepwise travel of the transducer head to enable the latter to access the individual tracks on the disk. I am aware of two prior art devices employing a flexible band or belt, as in my present invention, for such motion translation in FDDs. These are Mayeda U.S. Pat. No. 3,881,189 and Dalziel U.S. Pat. No. 4,161,004. Both patents are alike in that the opposite ends of the band are screwed to the head carriage.

I object to the screwing of the band ends to the head carriage. The band must be in exact alignment, free from torsion, for proper translation of motor revolution into linear head travel throughout the expected lifetime of the FDD. When the screws are being tightened for mounting the band of the prior art devices at the time of the assemblage of the FDD, they tend to impart torsional stresses to the band. The torsioned band will not only have a shorter useful life but also produce noise as the transducer head is transported radially of the disk in the use of the FDD. Conventionally, therefore, utmost attention and considerable time have had to be expended for mounting the band.

SUMMARY OF THE INVENTION

I have hereby found out how to expedite the mounting, in exact alignment, of the flexible, nonstretchable band in rotary to linear converters of the class under consideration.

My invention may be summarized as a rotary to linear converter for translating the bidirectional rotation of a drive motor into the linear reciprocation of a guided member such as a head carriage in a data transfer apparatus, the drive motor having an output shaft extending at right angles with a predetermined linear path of the guided member. The rotary to linear converter includes a band of flexible, nonstretchable material looped about, and affixed to, a pulley nonrotatably mounted on the output shaft of the drive motor, with the opposite end portions of the band extending away from the pulley. The guided member has formed thereon a first hook engaged with a first of the opposite ends of the band to anchor the first end to the guided member against accidental detachment, the first hook and the first end of the band being adapted in relation to each other so that a first end portion of the band, associated with the first end thereof, is angularly displaceable in its own plane about the first hook. Also formed on the guided member is a second hook engaged with a second of the opposite ends of the band to anchor the second end to the guided member against accidental detachment, the second hook and the second end of the band being adapted in relation to each other so that a second end portion of the band, associated with the second end thereof, is angularly displaceable in its own plane about the second hook. Resilient means is provided for imparting tension to the band in its longitudinal direction.

Attention should be directed to the fact that the band has its opposite ends hooked to the guided member so that at least the opposite end portions of the band are angularly displaceable in their own plane about the hooks. Resiliently tensioned in its longitudinal direction, the band automatically aligns itself upon engagement of its ends with the hooks. Accordingly, not only is the band mounted without torsion, but also the mounting of the band is made materially easier than heretofore.

The above and other features and advantages of my invention and the manner of realizing them will become more apparent, and the invention itself will best be understood, from a study of the following description and appended claims, with reference had to the attached drawings showing the preferred embodiments of my invention.

DESCRIPTION OF THE PREFERRED EMBODIMENTS

I will now describe in detail the rotary to linear converter of our invention in an FDD environment, in which the converter is used for translating the bidirectional, incremental rotation of an electric stepping motor into the linear, stepwise, back and forth travel of a magnetic transducer head in a radial direction of a flexible magnetic disk.

Figure 1:
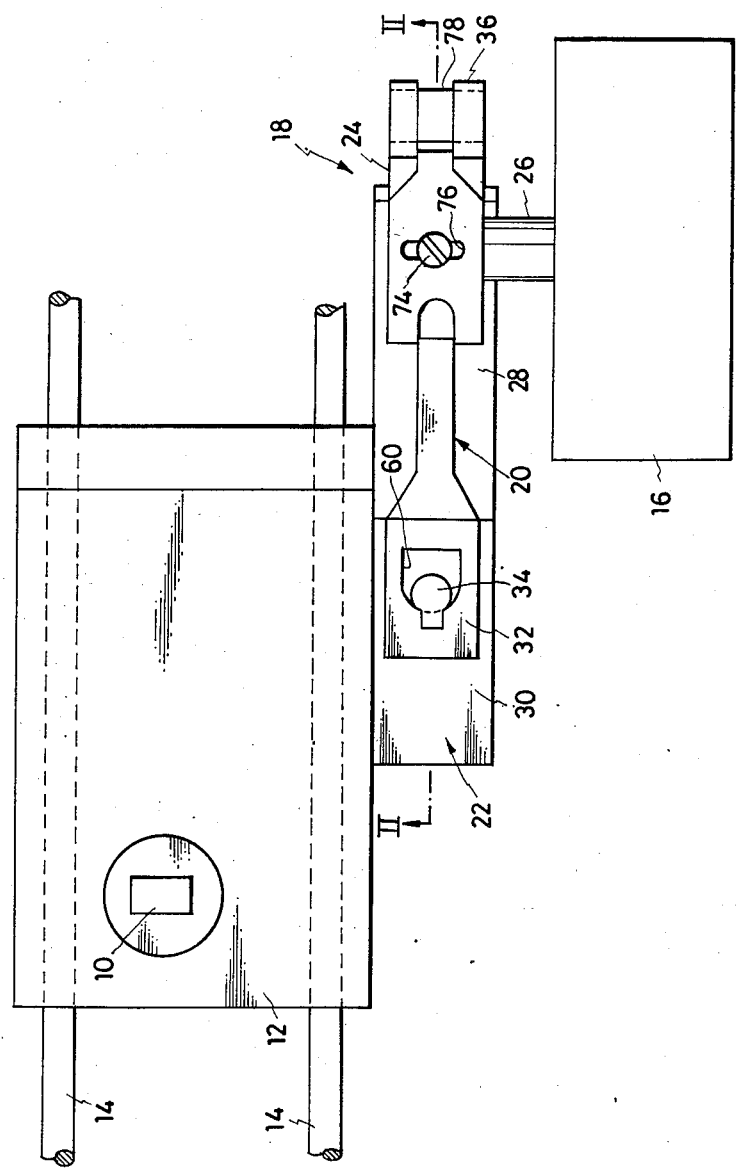
FIG. 1 is a top plan diagrammatically illustrating the rotary to linear converter of my invention as adapted for positioning a magnetic transducer head in a radial direction of a flexible magnetic disk in an FDD.

Shown at 10 in FIG. 1 is the transducer head assembly operatively mounted on a head carriage 12 for data transfer contact with the flexible magnetic disk. I have not shown the magnetic disk and its drive mechanism because they bear no particular pertinence to my invention and, moreover, they can both be of conventional design. The head carriage 12 is movably mounted to a pair of guide rods 14 thereby to be guided radially of the unshown magnetic disk. A head drive motor 16 of the electric stepping type is coupled to the head carriage 12 via a rotary to linear converter 18 in accordance with my invention. With the incremental rotation of the head drive motor 16, the converter 18 causes the head carriage 12 to travel stepwise on the guide rods 14, making it possible for the transducer head assembly 10 to access the individual tracks on the magnetic disk.

Figure 2:
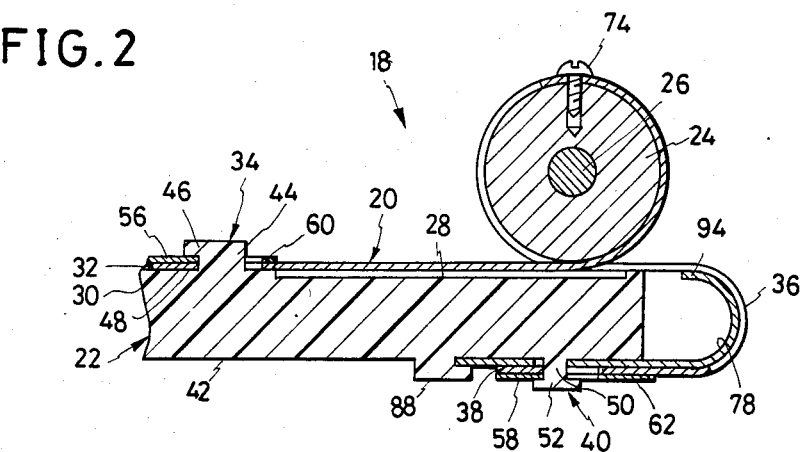
FIG. 2 is a vertical section through the rotary to linear converter of FIG. 1, taken along the line II—II therein.

As will be seen from both FIGS. 1 and 2, the rotary to linear converter 18 includes a band or belt 20 of steel or like flexible but nonstretchable material as its primary component. The head carriage 12 has an outrigger 22 formed substantially in one piece therewith, and the head drive motor 16 has a pulley 24 non-rotatably mounted on its output shaft 26, for connection to the band 20. The pulley 24 is disposed immediately over the carriage outrigger 22.

Looped about the pulley 24, the band 20 has a first portion extending rectilinearly away from the pulley over a depression 28 in the top surface 30 of the carriage outrigger 22 and terminating in a first end 32, which end is anchored to a first hook 34 on the top surface of the carriage outrigger. The band 20 has a second portion extending in the opposite direction away from the pulley 24 and, after curving to provide a U shaped bight 36, terminating in a second end 38, which end is anchored to a second hook 40 on the bottom surface 42 of the carriage outrigger 22. The head drive motor 16 is disposed with its output shaft 26 oriented at right angles with the predetermined path of the head carriage 12 defined by the guide rods 14. Therefore, as seen in a plan view as in FIG. 1, the band 20 extends parallel to the path of the head carriage 12.

Figure 3:
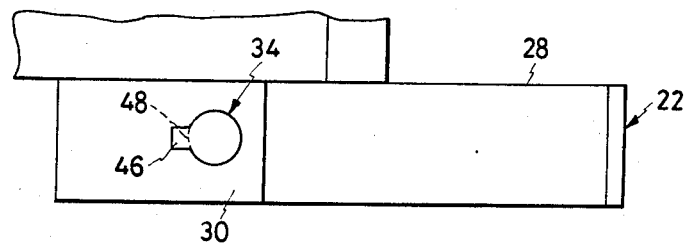
FIG. 3 is a fragmentary top plan of the head carriage of the FDD, showing in particular one of the hooks on the outrigger of the carriage for operatively retaining one end of the flexible band of the rotary to linear converter.
Figure 4:
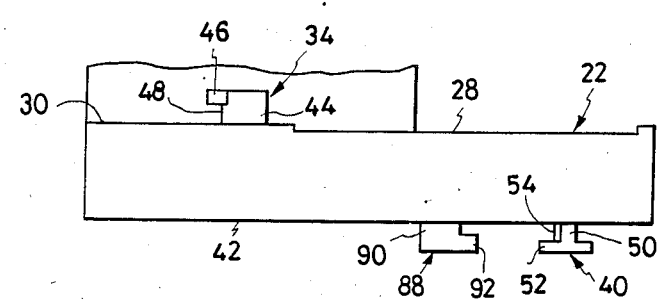
FIG. 4 is a side elevation of the carriage outrigger of FIG. 3, showing in particular the first and second hooks, as well as a spring retainer, on the carriage outrigger for operatively retaining the flexible band and leaf spring of the rotary to linear converter.
Figure 5:
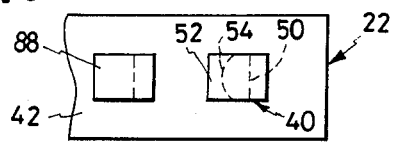
FIG. 5 is a fragmentary bottom plan of the carriage outrigger, showing in particular the second hook and spring retainer thereon.

I have shown the first hook protuberance 34 also in FIGS. 3 and 4, and the second hook 40 also in FIGS. 4 and 5. The first hook 34 comprises an upstanding neck 44 and an overhanging head 46, the latter being formed on the top of the former and directed away from the pulley 24. The neck 44 takes the form of an upstanding cylinder in this embodiment. The cylindrical shape of the neck 44 is not essential; in any event, the neck should have a contact surface 48 of rounded or substantially arcuate shape as seen in a plan view as in FIG. 3 or taken in a horizontal section. This contact surface 48 is intended for direct working engagement with the first end 32 of the band 20, as will be later explained in more detail.

With reference to FIGS. 2, 4 and 5 the second hook 40 also comprises a neck 50 depending from the underside of the carriage outrigger 22, and an enlarged head 52 formed on the bottom end of the neck. The second hook neck 50 also has a contact surface 54 of rounded or substantially arcuate shape as seen in a plan view as in FIG. 5 or taken in a horizontal section. The contact surface 54 of the second hook 40 is intended for direct working engagement with the second end 38 of the band 20. Unlike the first hook head 46 the second hook head 52 protrudes both rightwardly and leftwardly, as seen in FIGS. 2 and 4, beyond the neck 50 for the purposes to be set forth presently.

Figure 8:
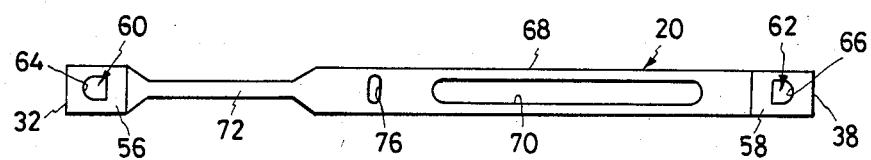
FIG. 8 is a plan view of the flexible band.
Figure 9:
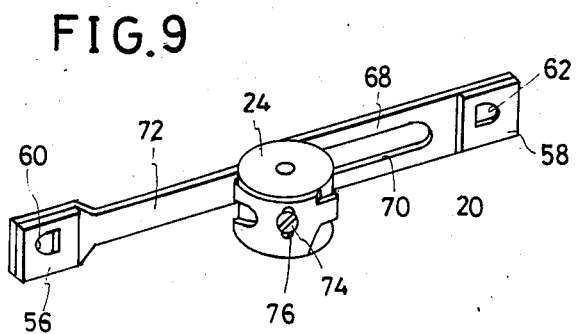
FIG. 9 is a perspective view showing the flexible band looped around the pulley in the FDD of FIG. 1.

I have illustrated in FIG. 8 the band 20 stretched out, and in FIG. 9 the same band looped around the pulley 24. It will be observed from these illustrations that the band 20 has its opposite ends 32 and 38 reinforced by rectangular pieces of rigid sheet metal 56 and 58. These reinforced ends 32 and 38 are apertured at 60 and 62 for engagement with the first 34 and second 40 hooks, respectively, on the carriage outrigger 22. The apertures 60 and 62 must of course be large enough to fit over the respective hooks 34 and 40. Further the apertures 60 and 62 are bounded in part by substantially arcuate edges 64 and 66 having radii greater than the radii of the substantially arcuate contact surfaces 48 and 54 of the hooks 34 and 40, respectively, on the carriage outrigger 22. Held against the contact surfaces 48 and 54 of the hooks 34 and 40, the arcuate edges 64 and 66 of the band 20 are intended to allow angular displacement of its opposite end portions in their own planes about the respective hooks 34 and 40.

Figure 10:
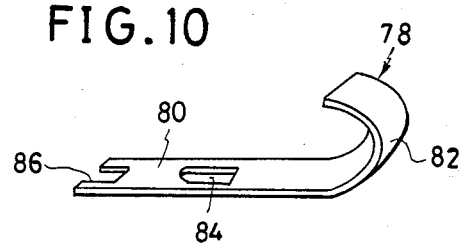
FIG. 10 is a perspective view of the leaf spring.

It will also be noted from FIGS. 9 and 10 that the part of the band 20 intermediate the reinforced ends 32 and 38 is longitudinally divided into a relatively wide portion 68 having a slot 70 cut therein, and a narrower portion 72 having a width less than that of the slot 70. The band 20 has its midportion looped about the pulley 24, with the narrow portion 72 threaded through the slot 70 in the wide portion 68, so that the two portions 68 and 72 cross each other. The looped midportion is fastened to the pulley 24 by a screw 74 passing a clearance hole or slot 76 in the wide portion 68.

I recommend that this clearance hole 76 be elongated transversely of the band 20. Such transversely elongated slot will make easier the lateral placement of the band 20 on the pulley 24 and, in consequence, the alignment of the band, as will be better understood from the subsequent description of the way in which the band 20 is mounted in place.

The rotary to linear converter 18 further includes a leaf spring 78, shown mounted in position in FIGS. 1 and 2 and by itself in FIG. 10, for imparting tension to the band 20 in its longitudinal direction. Made of standard spring material having a relatively high coefficient of elasticity, the leaf spring 78 has a straight portion 80 and a curved portion 82. The straight portion 80 has an aperture 84 defined therein for receiving the second hook 40 on the underside of the carriage outrigger 22, with the leaf spring 78 disposed internally of the band 20 and with its curved portion 82 held against the bight 36 of the band. Thus mounted in position, as best depicted in FIG. 2, the leaf spring 78 has its curved portion 82 self biased to urge the bight 36 of the band 20 in such a direction that the bight tends to spread out. Essentially, therefore, the band 20 is spring tensioned in its longitudinal direction.

A recess 86 is formed in one end of the straight portion 80 of the leaf spring 78 away from the curved portion 82. As illustrated in detail in FIGS. 6 and 7, the recess 86 is for engagement with another hooklike protuberance 88, which I will call a spring retainer, formed on the underside of the carriage outrigger 22 and in the vicinity of the second hook 40. FIG. 4 best indicates that the spring retainer 88 comprises a neck 90 for engagement in the recess 86 in the leaf spring 78 against spring displacement in its lateral direction, and a head 92 directed toward the second hook 40 for engagement with the leaf spring to lock its recessed end against displacement away from the carriage outrigger 22.

For the assemblage of the rotary to linear converter 18 in accordance with my invention, the flexible band 20 may first be looped about the pulley 24, with its narrow portion 72 inserted in and through the slot 70 in its wide portion 68. It will be noted from FIG. 1 that the narrow portion 72 of the looped belt 20 is directed toward the first hook 34, the wide portion 68 of the belt being directed away from the first hook.

Then the band may be fastened to the pulley 24 by the screw 74 inserted in and through the clearance hole or slot 76. At this juncture the screw 74 may be tightened only to such an extent that the band is displaceable laterally, or in the axial direction of the pulley 24, with respect to the pulley.

Figure 6:
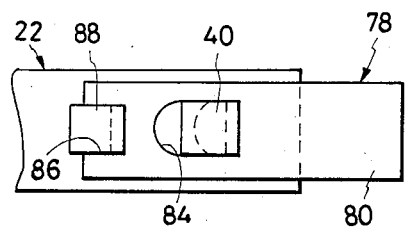
FIG. 6 is a view similar to FIG. 5 except that the leaf spring is mounted thereto.
Figure 7:
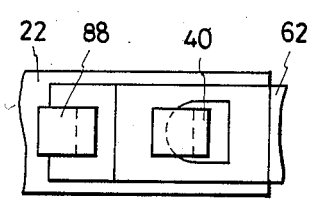
FIG. 7 is also a view similar to FIG. 5 except that not only the leaf spring but also the flexible band, shown fragmentarily, is mounted thereto.

Next comes the step of mounting the leaf spring 78. The straight portion 80 of the leaf spring 78 may be held against the underside of the carriage outrigger 22, receiving the second hook 40 thereon in its aperture 84. Upon full insertion of the second hook 40 in the aperture 84, the leaf spring 78 may be slid leftwardly as seen, for instance, in FIG. 2, until the right hand edge of the aperture 84 becomes caught between the carriage outrigger 22 and the enlarged head 52 of the second hook 40 thereon. Further the neck 90, FIG. 4 of the spring retainer 88 on the carriage outrigger 22 will become engaged in the recess 86 in the leaf spring 78, with its head 92 underlying the adjacent edge portion of the leaf spring. Now the straight portion 80 of the leaf spring 78 has been positively attached to the carriage outrigger 22, as best depicted in FIG. 6, against the possibility of displacement in any direction. The curved portion 82 of the leaf spring 78 protrudes beyond the carriage outrigger 22 and is turned upwardly.

Then the wide portion 68 of the band 20 may be bent downwardly over the curved portion 82 of the leaf spring 78 and further, by receiving the second hook 40 on the underside of the carriage outrigger 22 in its aperture 62, may be held against the straight portion 80 of the leaf spring.

Then, with the first end 32 of the band 20 held between fingertips, the pulley 24 may be manually turned clockwise, as viewed in FIG. 2, with the consequent deflection of the leaf spring 78 as the leaf spring bight 36 is taken up by the pulley. Thus the first end 32 of the band 20 will be fed leftwardly, as seen in both FIGS. 1 and 2, so that the apertures 60 in its first end 32 will become engageable with the first hook 34 on the carriage outrigger 22.

Although the band 20 may slack upon full insertion of the first hook 34 in its aperture 60, the leaf spring 78 will immediately take up such a slack. When not deflected by the band 20, the leaf spring 78 has its end portion 92, FIG. 2, held above the top surface 30 of the carriage outrigger 22. Consequently, on being mounted in place as above, the band 20 will be spring tensioned in its longitudinal direction.

Advantageously, according to the rotary to linear converter 18 of my improved construction, the band 20 automatically aligns itself, as viewed in a plan view as in FIG. 1, on having its apertured ends 32 and 38 engaged with the hooks 34 and 40 on the carriage outrigger 22. This self aligning feature of the band 20 is due in part to the engagement of the rounded contact surfaces 48 and 54 of the hooks 34 and 40 with the rounded edges 64 and 66 bounding parts of the band apertures 60 and 62, and in part to the spring tensioning of the band 20 in its longitudinal direction. The opposite end portions of the band 20 are readily angularly displaceable in their own planes about the hooks 34 and 40. Further, being longitudinally tensioned and still incompletely fastened to the pulley 24, the band will readily align itself without manual assistance. The spring tensioning of the band 20 yields the additional advantage of holding its apertured ends in positive engagement with the heads of the hooks 34 and 40 against the possibility of accidental detachment.

The screw 74 may be fully tightened following the self aligning of the band 20. It will be appreciated that the mounting and adjustment of the band 20 is substantially completed with the engagement of its opposite ends with the hooks 34 and 40. The length of time required for this purpose can thus be reduced to an absolute minimum.

Second Form

Figure 11:
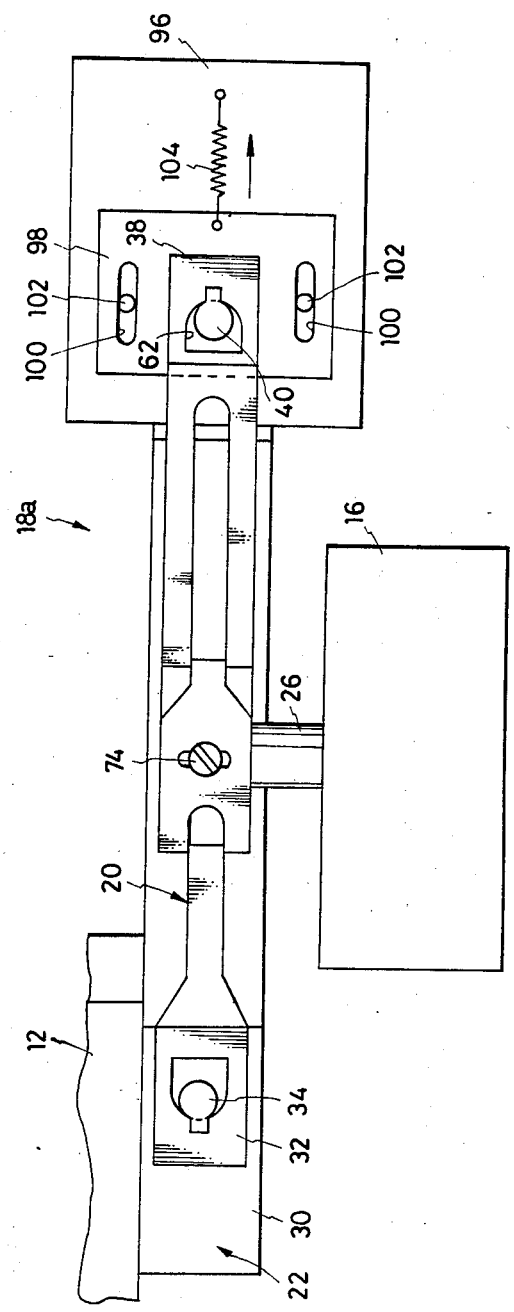
FIG. 11 is a top plan of another preferred form of the rotary to linear converter in accordance with my invention.

I have illustrated in FIG. 11 an alternative form of rotary to linear converter 18a in accordance with my invention. This alternative construction features a linear arrangement of the opposite end portions of the band 20 substantially in a tangential direction of the pulley 24, and parallel to the predetermined path of the head carriage 12, as they extend from the pulley. Thus, although the first end 32 of the band 20 is engaged with the first hook 34 on the carriage outrigger 22 as in the foregoing embodiment, the second end 38 of the band is anchored in a different manner.

The carriage outrigger 22 has an extension or enlargement 96 formed in approximately coplanar relation thereto. Slidably mounted on this carriage outrigger extension 96 is a base 98 having a pair of guide slots 100 each slidably receiving an upstanding pin 102 on the carriage outrigger extension. The guide slots 100 extend parallel to the linear path of the carriage 12, so that the base 98 is constrained to displacement in the same direction relative to the carriage outrigger extension 96. The second hook 40 is formed on the base 98, for engagement in the second aperture 62 in the second end 38 of the band 20. A helical tension spring 104 has its opposite extremities anchored to the carriage outrigger extension 96 and to the base 98, biasing the latter in a direction to impart the required longitudinal tension to the band 20.

The configurations of the hooks 34 and 40 and of the apertures 60 and 62 in the band 20 can be as set forth above in connection with the first described embodiment. The other parts of the apparatus can also be constructed and arranged as in the preceding embodiment. It is therefore apparent that this alternative construction gains the same advantages as the FIGS. 1 through 10 embodiment.

Although I have shown and described my invention in terms of but two preferable embodiments thereof, I recognize, of course, that my invention could be embodied in other forms within the broad teaching hereof. As will be readily understood, the opposite ends of the flexible, nonstretchable band 20, and the two hooks 34 and 40 on the linearly movable member 12, could take various forms other than those disclosed herein, it being only necessary that the band ends be hooked to the linearly movable member so as to allow the angular displacement of the band end portions in their own planes, resulting in the self alignment of the band under longitudinal tension. I must also point out that the FDD represents but one of the many possible applications of the rotary to linear converter of my invention, another possible application being the optical disk drive.

I claim:

1. A rotary to linear converter for translating the bidirectional rotation of a drive motor into the linear reciprocation of a guided member such as a head carriage in a data transfer apparatus, the drive motor having an output shaft extending at right angles with a predetermined linear path of the guided member, the rotary to linear converter comprising:
   (a) a pulley nonrotatably mounted on the output shaft of the drive motor;
   (b) a band of flexible, nonstretchable material looped about the pulley and affixed thereto with opposite end portions of the band extending away from the pulley;
   (c) there being first and second apertures defined respectively in the opposite first and second ends of the band;
   (d) a first hook on the guided member loosely in the first aperture in the band to anchor the first end thereof to the guided member, the first hook having an overhanging head to prevent the accidental detachment of the band, the first hook and the first aperture being so adapted in relation to each other that a first end portion of the band, associated with the first end thereof, is angularly displaceable in its own plane about the first hook;
   (e) a second hook on the guided member loosely engaged in the second aperture in the band to anchor the seccond end thereof to the guided member, the second hook also having an overhanging head to prevent the accidental detachment of the band, the second hook and the second aperture being so adapted in relation to each other that a second end portion of the band, associated with the second end thereof, is angularly displaceable in its own plane about the second hook; and
   (f) resilient means for imparting tension to the band in its longitudinal direction.

2. The rotary to linear converter as recited in claim 1, wherein the first and second hooks on the guided member are formed to include substantially arcuate contact surfaces, and wherein the first and second apertures in the band are bounded at least in part by substantially arcuate edges for contact with the substantially arcuate contact surfaces of the first and second hooks respectively, the substantially arcuate edge defining each of the first and second apertures having a radius greater than the radius of the substantially arcuate contact surface of each of the first and second hooks.

3. The rotary to linear converter as recited in claim 1, wherein the first and second hooks are formed on opposite surfaces of the guided member, and wherein the pulley is disposed on the same side of the guided member as the first hook, with the first end portion of the band extending linearly from the pulley to the first hook, and with the second end portion of the band forming a bight as it extends away from the pulley to the second hook.

4. The rotary to linear converter as recited in claim 3, wherein the resilient means comprises a leaf spring mounted to the guided member and disposed internally of the bight of the second end portion of the band to urge the bight outwardly.

5. The rotary to linear converter as recited in claim 4, wherein the leaf spring has an aperture adjacent one end thereof and is mounted to the guided member by receiving the second hook in its aperture.

6. The rotary to linear converter as recited in claim 5, wherein the guided member has formed thereon a spring retainer disposed on the same side as the second hook, the spring retainer engaging said one end of the leaf spring and coacting with the second hook to retain the leaf spring in place on the guided member.

7. The rotary to linear converter as recited in claim 1, wherein the opposite end portions of the band extend away from the pulley substantially along a line tangent to the pulley.

8. The rotary to linear converter as recited in claim 7, further comprising a base mounted to the guided member and constrained to displacement relative to the guided member in a direction parallel to the linear path of the guided member, the base having the second hook formed thereon, and wherein the resilient means is connected between the base and the guided member.

9. A rotary to linear converter for translating the bidirectional rotation of a drive motor into the linear reciprocation of a guided member such as a head carriage in a data transfer apparatus, the drive motor having an output shaft extending at right angles with a predetermined linear path of the guided member, the rotary to linear converter comprising:
   (a) a pulley nonrotatably mounted on the output shaft of the drive motor;
   (b) a band of flexible, nonstretchable material looped about the pulley and affixed thereto with opposite end portions of the band extending away from the pulley,
   (c) a first hook on the guided member engaged with a first of the opposite ends of the band to anchor the first end to the guided member, against accidental detachment, the first hook and the first end of the band being adapted in relation to each other so that a first end portion of the band, associated with the first end thereof, is angularly displaceable in its own plane about the first hook;
   (d) a second hook on the guided member engaged with a second of the opposite ends of the band to anchor the second end to the guided member against accidental detachment, the second hook and the second end of the band being adapted in relation to each other so that a second end portion of the band, associated with the second end thereof, is angularly displaceable in its own plane about the second hook;
   (e) resilient means for imparting tension to the band in its longitudinal direction; and
   (f) wherein the band has a slot formed therein at a point intermediate the opposite ends thereof, the slot being elongated tranversely of the band, and wherein the band is affixed to the pulley by a threaded fastener element inserted in and through the slot, the slot being effective to allow the readjustment of the lateral position of the band on the pulley following the engagement of the first and second hooks on the guided member with the first and second ends of the band at the time of the mounting of the band.

* * * * *